(12) United States Patent
Sloo et al.

(10) Patent No.: US 8,234,583 B2
(45) Date of Patent: Jul. 31, 2012

(54) MEDIA ASSET PIVOT NAVIGATION

(75) Inventors: David H. Sloo, Menlo Park, CA (US);
Ronald A. Morris, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/485,291

(22) Filed: Jun. 16, 2009

(65) Prior Publication Data

US 2010/0318927 A1    Dec. 16, 2010

(51) Int. Cl.
*G06F 3/14* (2006.01)
*G06F 3/17* (2006.01)
(52) U.S. Cl. ........... 715/764; 707/3; 707/102; 707/622; 706/47; 9/227
(58) Field of Classification Search .......... 715/200–277, 715/700–867; 700/701–866; 709/201–229; 705/50–79; 345/30–111; 348/206–231.9; 707/102, 200–206, 622, 3; 706/47
See application file for complete search history.

(56) References Cited

U.S. PATENT DOCUMENTS

| | | | |
|---|---|---|---|
| 7,189,017 B2 | 3/2007 | McLoone | |
| 7,685,134 B2 * | 3/2010 | Myka et al. | 707/622 |
| 2005/0097606 A1 | 5/2005 | Scott et al. | |
| 2007/0028270 A1 | 2/2007 | Ostojic et al. | |
| 2007/0220045 A1 | 9/2007 | Morris et al. | |
| 2008/0120325 A1 * | 5/2008 | Davis | 707/102 |
| 2008/0141242 A1 | 6/2008 | Shapiro | |
| 2008/0172695 A1 | 7/2008 | Migos et al. | |
| 2008/0288461 A1 * | 11/2008 | Glennon et al. | 707/3 |
| 2009/0022472 A1 | 1/2009 | Bronstein et al. | |
| 2009/0276531 A1 * | 11/2009 | Myka et al. | 709/227 |
| 2010/0070448 A1 * | 3/2010 | Omoigui | 706/47 |

OTHER PUBLICATIONS

Romero, et al., "HyperReal: A Hypermedia Model for Mixed Reality", retrieved at<<http://citeseer.ist.psu.edu/viewdoc/download-?doi=10.1.1.65.4060&rep=rep1&type=pdf>>, HT'03, Aug. 26-30, 2003, Nottingham, United Kingdom, pp. 9.

Beek, et al., "Metadata-Driven Multimedia Access", retrieved at<<http://ieeexplore.ieee.org/stamp/stamp.jsp?arnumber=01184338>>, pp. 13, Mar. 2003.

* cited by examiner

*Primary Examiner* — Ruay Ho
(74) *Attorney, Agent, or Firm* — Wolfe-SBMC

(57) ABSTRACT

Media asset pivot navigation is described. In various embodiments, collections of media assets are determined from relational metadata that corresponds to the media assets in a respective collection. Each collection of media assets are represented as a navigation axis along which the media assets in a respective collection can be located, and a media asset can be associated with multiple collections of media assets based on the relational metadata. A media asset navigation interface is generated for display from which the collections of media assets can be navigated to locate the media assets for selection. The media asset navigation interface includes a display of a collection of media assets represented as a navigation axis. A navigation input can be received to pivot from the navigation axis to an alternate navigation axis and initiate a display of an additional collection of media assets that are represented as the alternate navigation axis.

20 Claims, 5 Drawing Sheets

MEDIA ASSET PIVOT NAVIGATION

BACKGROUND

Portable devices are increasingly more common and mobile, such as laptop computers, tablet personal computers (PCs), mobile PCs, as well as other mobile data, messaging, and/or communication devices. While portable devices have become more mobile and convenient, the size of device integrated displays has decreased to accommodate the mobility and convenience of the devices. Current visual browsers for videos, photos, and game content rely on the ability of a user to recognize particular media assets in order to select or make decisions based on those media assets. This limits the display size of the media assets because a user needs to see enough of an image to discern a media asset for selection. As the display screens become smaller, pictorial details can be lost.

Additionally, the current media interfaces that are utilized to discover, sort, locate, and sample media content are uniformly built on top-down information hierarchies that are known to break down for very large, disparate sets of media content. For example, the data set of Web pages has transitioned discovery from content category searching to generic Web searches that use heuristics to find arbitrary content or to refine subsets of discovered content and data. Typically, a Web search is initiated with text input which is not well-suited to initiate content discovery for non-text content and in keyboard-free contexts, such as in the navigation space for television and entertainment systems.

SUMMARY

This summary is provided to introduce simplified concepts of media asset pivot navigation. The simplified concepts are further described below in the Detailed Description. This summary is not intended to identify essential features of the claimed subject matter, nor is it intended for use in determining the scope of the claimed subject matter.

Media asset pivot navigation is described. In various embodiments, collections of media assets are determined from relational metadata that corresponds to the media assets in a respective collection. Each collection of media assets are represented as a navigation axis along which the media assets in a respective collection can be located, and the media assets can be associated with multiple collections of media assets based on the relational metadata. A media asset navigation interface is generated for display from which the collections of media assets can be navigated to locate the media assets for selection. The media asset navigation interface includes a display of a collection of media assets represented as a navigation axis. A navigation input can be received to pivot from the navigation axis to an alternate navigation axis and initiate a display of an additional collection of media assets that are represented as the alternate navigation axis.

BRIEF DESCRIPTION OF THE DRAWINGS

Embodiments of media asset pivot navigation are described with reference to the following drawings. The same numbers are used throughout the drawings to reference like features and components.

DETAILED DESCRIPTION

Embodiments of media asset pivot navigation provide that a user can navigate the relationships of media assets in an abstract information space, rather than simply traversing lists of media assets when searching for viewing choices, song selections, photo viewing, and the like. A collection of media assets can be represented as a navigation axis along which the media assets in a respective collection can be located. Navigation axes that correlate to various collections of media assets are an organizational structure for a media asset navigation interface via which a user can navigate and locate media assets without a typed or text input. A user can pivot on the navigation axes that represent the collections of media assets to search and locate media assets. The navigation axes provide that a user can navigate from one media asset to a next according to the ordered collections, and the order in which media assets are encountered or discovered depends on the current navigation pivot.

Additionally, navigation input is not tied to any one particular device or input devices for navigation and axis pivot inputs. Input devices that facilitate user-selectable inputs and selections to navigate a media asset navigation interface can include a two-input controller, a two-dimensional or three-dimensional controller, a pointing device, a touch controller, and/or a gestural controller that can all be utilized for various embodiments of media asset pivot navigation.

While features and concepts of the described systems and methods for media asset pivot navigation can be implemented in any number of different environments, systems, and/or various configurations, embodiments of media asset pivot navigation are described in the context of the following example systems and environments.

Figure 1:
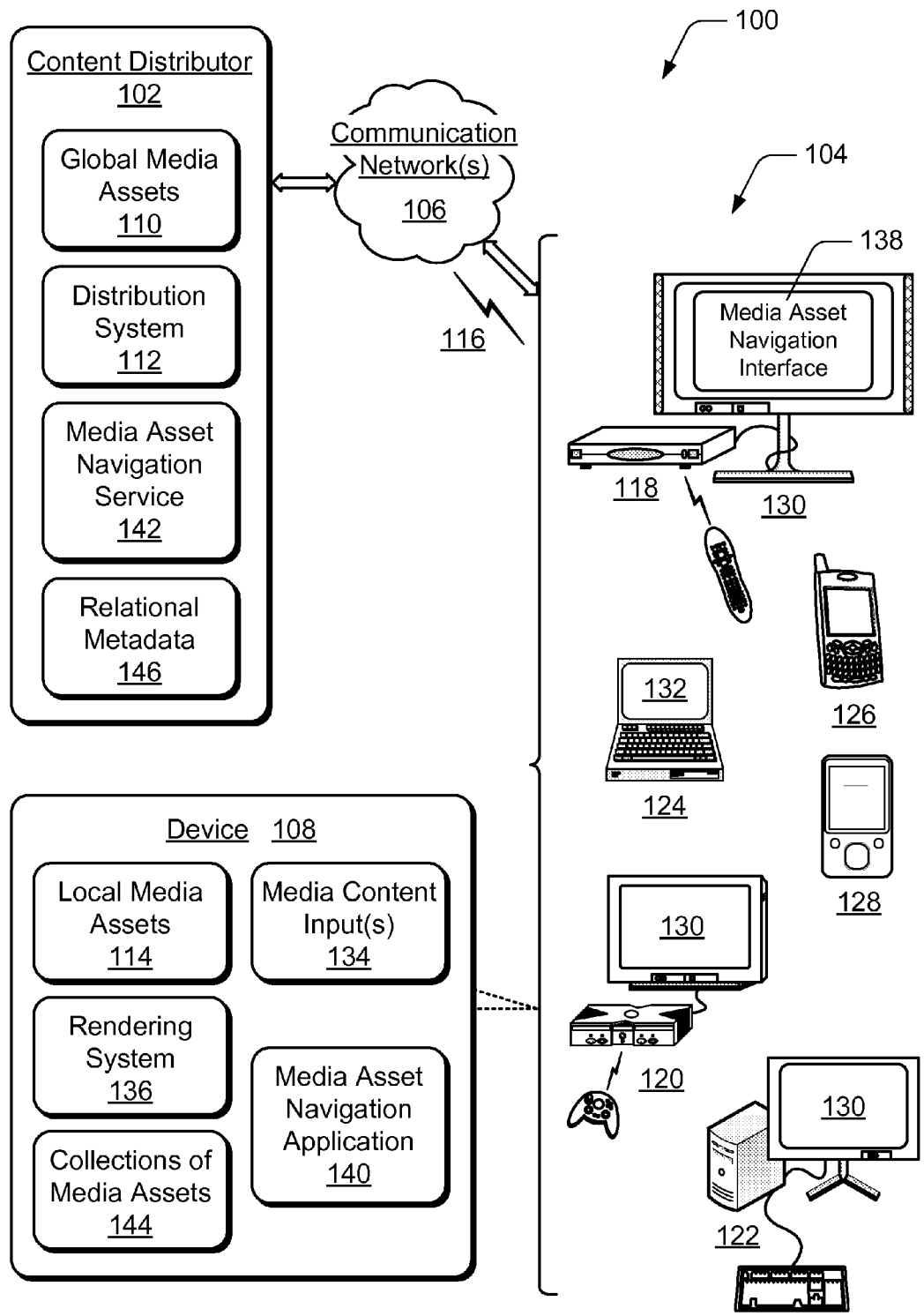
FIG. 1 illustrates an example system in which embodiments of media asset pivot navigation can be implemented.

FIG. 1 illustrates an example system 100 in which various embodiments of media asset pivot navigation can be implemented. System 100 includes a content distributor 102 implemented for media content distribution and communication with various client devices 104 via communication networks 106. An example device 108 is representative of various client devices 104 that receive media assets 110 when distributed from content distributor 102. In a media content distribution system, the content distributor 102 can be implemented as one or more server devices that include a distribution system 112 to facilitate distribution of the media assets 110, metadata, and other associated data to multiple viewers, users, customers, subscribers, viewing systems, consumer devices, and the various client devices 104.

Media content (e.g., to include recorded media content) includes media assets and any type of audio, video, and/or image data received from any media content and/or data source. In various implementations, media assets include both global media assets 110 that are maintained at the content distributor 102 and available to any of the various client devices 104, and include local media assets 114 that are maintained local to a device, such as the local media assets 114 stored on device 108. As described herein, a media asset can include recorded video content, video-on-demand content, television content, television programs (or live programming), advertisements, commercials, music files, movies, video clips, digital photographs, documents and other types of media assets. Other media content can include interactive games, network-based applications, and any other content, assets, or data (e.g., to include user interface data, advertising content, closed captions data, content metadata, search results and/or recommendations, etc.).

The communication networks 106 include any type of a data network, voice network, broadcast network, an IP-based network, and/or a wireless network 116 that facilitates communication of data and media content in any format. The communication networks 106 can be implemented using any type of network topology and/or communication protocol, and may be represented or otherwise implemented as a combination of two or more networks. In addition, any one or more of the arrowed communication links facilitate two-way data communication.

The various client devices 104 in system 100 can be implemented as any one or combination of a wired and/or wireless device, as any form of television client device 118 (e.g., television set-top box, digital video recorder (DVR), etc.), gaming device 120, computer device 122, portable computer 124, consumer device, media device, communication and/or messaging device, video processing and/or rendering device, appliance device, electronic device, and/or as any other type of device that is implemented to receive media content in any form of audio, video, and/or image data. A client device 104 may also be implemented as any type of mobile phone 126 (e.g., cellular, VoIP, WiFi, etc.), a portable media device 128 (e.g., a personal media player, portable media player, handheld media player, etc.), or any other wired and/or wireless device.

The various client devices 104 shown in system 100 can be implemented as components in client systems that include a respective display device 130, or as a client device that includes an integrated display 132. A display device 130 can be implemented as any type of a television, high definition television (HDTV), LCD, or similar display system. The various client devices 104 can also be associated with one or more input devices, such as a remote control device for user-selectable inputs and selections to the television client device 118, a gaming controller for user-selectable inputs to the gaming device 120, a keyboard and mouse input devices for user-selectable inputs to the computer device 122 and to portable computer 124, an alphanumeric keypad for user-selectable inputs to the mobile phone 126, and various user-selectable inputs to the portable media device 128. Other input devices for user-selectable inputs and selections to the various devices can include a two-input controller, a two-dimensional or three-dimensional controller, a pointing device, a touch controller, and/or a gestural controller that can be utilized for the various embodiments of media asset pivot navigation as described herein.

Any of the devices described herein can be implemented with any number and combination of differing components as described with reference to the example device shown in FIG. 5, such as one or more processors, communication components, data inputs, memory components, processing and control circuits, and/or a media content rendering system. The example device 108 is representative of the various client devices 104 that implement various embodiments of media asset pivot navigation.

In this example, device 108 includes media content inputs 134 to receive media assets 110 from content distributor 102. The media content inputs 134 can include any type of communication interfaces and/or data inputs, such as Internet Protocol (IP) inputs over which streams of media content (e.g., IPTV content) are received via an IP-based network. An IPTV receiver can include a media content input 134 to receive television content as an IPTV multicast via an Ethernet input port from content distributor 102. In addition, the media content inputs 134 include any type of broadcast and/or over-the-air inputs via which media content is received over the air.

Device 108 can also include one or more tuners to tune television channels and/or data streams for display and viewing, such as when device 108 is implemented as a television client device. In various implementations, a tuner can be implemented as a hardware tuner, or alternatively, as a software tuner that is implemented to tune to a television channel and/or data stream. Device 108 includes a rendering system 136 to receive and/or render media content in any form of audio, video, and/or image data received from any media content and/or data source. In various embodiments, the rendering system 136 is implemented to render a media asset navigation interface 138 for display, such as shown on the display device 130 that is associated with the television client device 118.

In this example system 100, device 108 includes a media asset navigation application 140 that can be implemented as computer-executable instructions and executed by processors to implement embodiments and/or features of media asset pivot navigation. In embodiments, any of the various devices 104 can include the media asset navigation application 140 to independently implement media asset pivot navigation. Alternatively or in addition, the content distributor 102 includes a media asset navigation service 142 that implements embodiments and/or features of media asset pivot navigation, either independently, or in conjunction with a media asset navigation application at a client device 104.

In various embodiments, the media asset navigation application 140 at device 108 and/or the media asset navigation service 142 at content distributor 102 is implemented to determine collections of media assets 144 and initiate a display of a media asset navigation interface from which the collections of media assets can be navigated to locate the media assets for selection. A collection of media assets can be determined based on any relatable factor, such as relational metadata 146, a genre that is common to the media assets, similarity of content or audience, content length, the content provider or creator, participating actors or entities, a content channel, a tone, a mood, a time within a media asset, and/or any other relevant media asset associations.

The relational metadata 146 can include any type of identifying criteria, descriptive information, and/or attributes associated with the global media assets 110 and the local media assets 114 that describes and/or categorizes the media assets. For example, metadata can include a media asset identifier, title, subject description, a date of production, artistic information, music compilations, and any other possible descriptive information about a particular media asset. Further, metadata can characterize a genre that describes a media asset, such as video content, as being an advertisement, a movie, a comedy show, a sporting event, a news program, a sitcom, a talk show, an action/adventure program, or as any number of other category descriptions.

Figure 2:
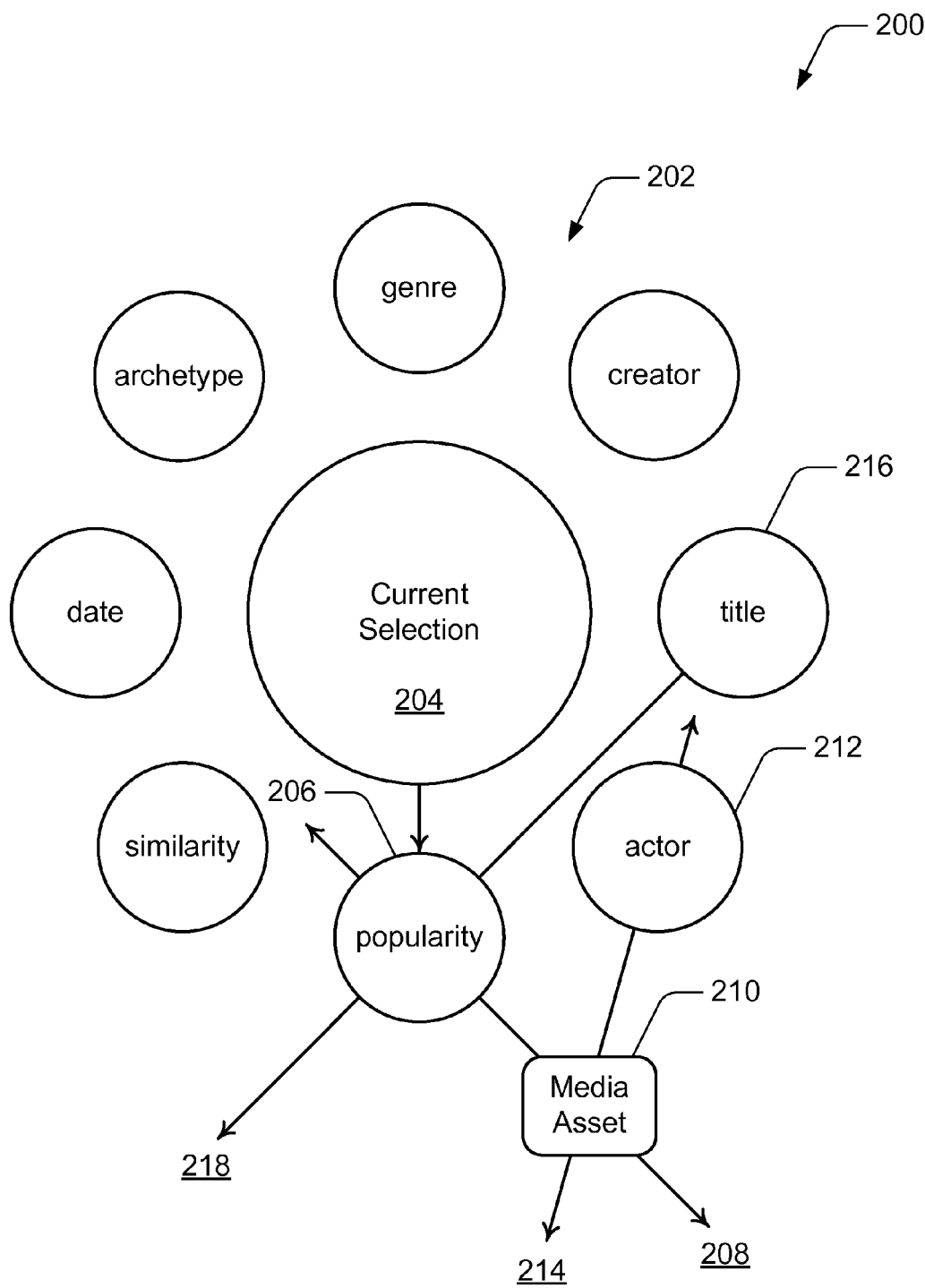
FIG. 2 illustrates navigation axes for collections of media assets in accordance with one or more embodiments.

FIG. 2 illustrates an example of media asset navigation axes 200 in various embodiments of media asset pivot navigation. A collection of media assets can be represented as a navigation axis along which the media assets in a respective collection can be located, and a media asset can be associated with one or more of the collections of media assets based on the relational metadata and the navigation axes. In this example, various collections of media assets 202 are illustrated around a current selection 204, such as a movie (e.g., a media asset) that a user is watching. The various collections of media assets in this example include genre, creator, title, actor, popularity, similarity, date, and archetype. Various collections of media assets can also be associated by any other relevant media asset associations.

A user can navigate the relationships of the media assets in an abstract information space, rather than simply traversing lists of media assets when searching for viewing choices, song selections, photo viewing, and the like. Each media asset in a navigation axis is likely related to other media assets in another navigation axis, which builds out a continuum for searching media assets. For example, a user can navigate from the current selection 204 to find movies (e.g., other media assets) that are popular based on a collection of popular media assets 206 along a navigation axis 208. The user may navigate the popular movies and pivot on a media asset 210 that is also associated with a collection of media assets 212 that include a particular actor. The collection of media assets 212 is represented by a navigation axis 214.

The example media asset navigation axes 200 are the organizational structure for a media asset navigation interface via which a user can navigate and locate media assets without a typed or text input. In addition, the user can locate the various media assets, such as live television programs, recorded video, movies, personal media such as photos and music, and other media content all from the collections of media assets represented in a media asset navigation interface. A user can pivot on the navigation axes that represent the collections of media assets to discover media content that is related to the current selection 204. For example, a user can search through a collection of movies by title 216, and then pivot on navigation axis 218 to search the same movies by popularity. The example media asset navigation axes 200 provide that a user can navigate from one media asset to a next according to the ordered collections, and the order in which media assets are encountered or discovered depends on the current navigation pivot.

Figure 3:
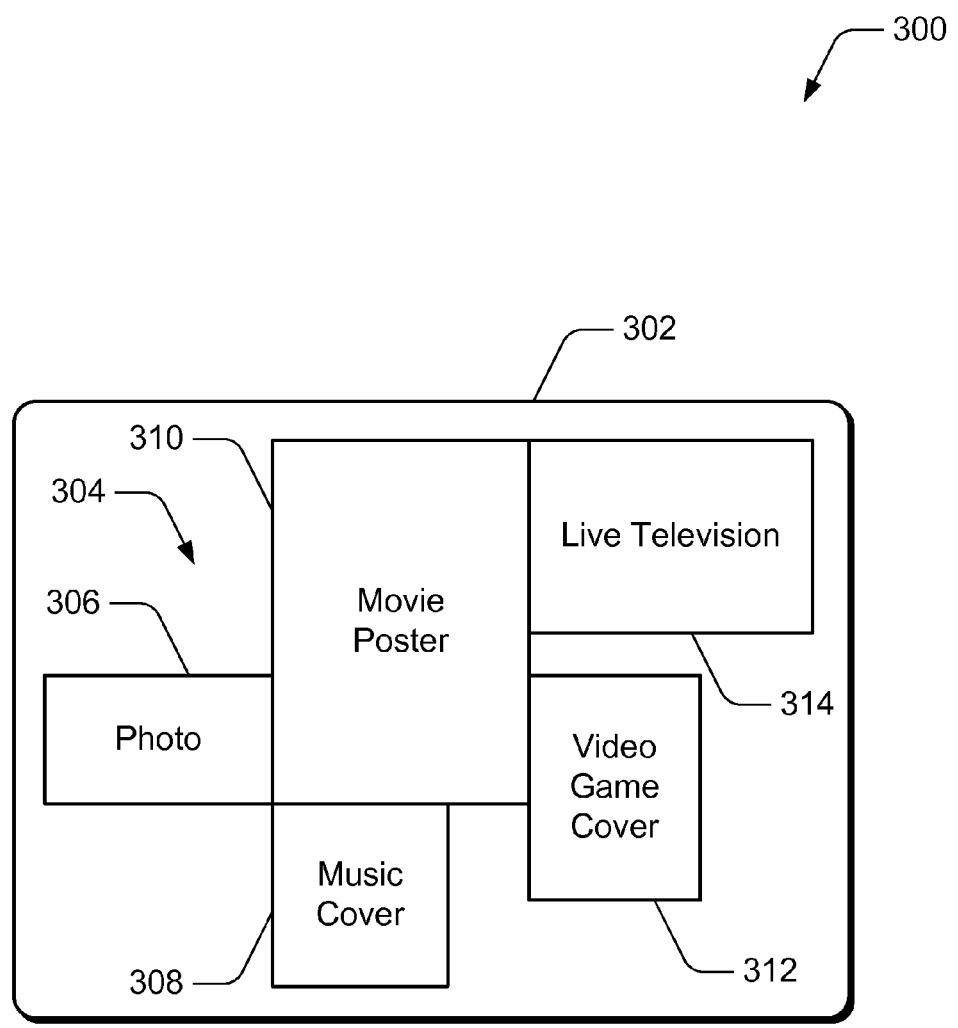
FIG. 3 illustrates a media asset navigation interface in accordance with one or more embodiments.

FIG. 3 illustrates an example 300 of a media asset navigation interface 302 in various embodiments of media asset pivot navigation. The navigation interface 302 is a visual representation of the multi-axis relational metadata and includes collections of media assets represented by visual elements 304. Although the visual elements 304 are shown in the navigation interface with text identifiers, the text identifiers are only included to signify the actual non-textual representations of the collections of media assets. In practice, a visual element 304 of a collection of media assets can be included in a media asset navigation interface as a video, picture-in-picture, image, photo, logo, or any other non-textual representation of a collection. In this example, a photo 306 represents a collection of digital photographs, an image 308 of a music cover represents a collection of music files, an image 310 of a movie poster represents a collection of recorded and/or video-on-demand movies, an image 312 of a video game cover represents a collection of video games, and a picture-in-picture 314 represents a collection of live television programs that are selectable for viewing.

The visual elements 304 each provide a coherent visual representation of the media assets in a collection on the media asset navigation interface 302. A visual element 304 for a collection of media assets can be selected, or otherwise determined as the visual element that is most likely discernable by a user to represent the media assets. For example, a collection of media assets may all be live television, such as represented by the picture-in-picture 314. The visual element corresponds to the television program that is likely the most popular viewing choice. A visual element for a collection of media assets can be a video, an image, a logo, or any other non-textual representation of the media assets. The visual element for a collection of media assets can correspond to one of the media assets in the collection, or can be a composite image or other non-textual representation that corresponds to more than one of the media assets.

A visual element can also be displayed to indicate what a user was last watching, viewing, or searching. For example, when the media asset navigation application 140 at device 108 receives a navigation pivot input, such as a user-initiated input to television client device 118 with the remote control device, the media asset navigation application 140 contextualizes the visual elements 304 to represent the collections of media assets based on previous user inputs to interact with one or more of the media assets of a collection. In various examples, the image 310 of the movie poster can be changed to a static image of a scene from the point in a movie where a viewer paused or stopped watching the movie. The photo 306 can represent the last collection of photos viewed by the user, may be displayed as the last photo selected for viewing, or may be displayed as the next photo for viewing. Similarly, the image 308 of the music cover can be displayed to represent the last music file that a user selected for playback.

As described above, input devices that facilitate user-selectable inputs and selections to navigate the media asset navigation interface 302 can include a two-input controller, a two-dimensional or three-dimensional controller, a pointing device, a touch controller, and/or a gestural controller that can all be utilized for the various embodiments of media asset pivot navigation as described herein. For example, navigation can be implemented with a simple controller that includes only a pivot input button and one axis of continuous navigation, such as a knob controller that provides navigation right and left across the media asset navigation interface.

With a three-dimensional controller, such as a game joystick, a user can simultaneously navigate along multiple axes. For example, pushing up on the joystick might move among genres from an origin (e.g., a selected media asset), and moving right and left would navigate through genres. Adding a third dimension, such as pushing down on the game joystick can initiate a navigation pivot among axes. Arbitrary pointing devices, such as a mouse or a touch controller, can also be utilized for navigation of the media asset navigation interface to directly touch and select visual elements for depth-wise navigation into a collection of media assets. A gestural controller provides a user arbitrary position navigation control within three dimensions. The position information can be relative, such as the position over a duration of time that is represented as a vector from a start position to an end position, without reference to an overall frame. A gestural controller that implements absolute position, such as the location of a gesture from within a room, can also be utilized for navigation of the collections of media assets displayed in a media asset navigation interface.

Example method 400 is described with reference to FIG. 4 in accordance with one or more embodiments of media asset pivot navigation. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 4:
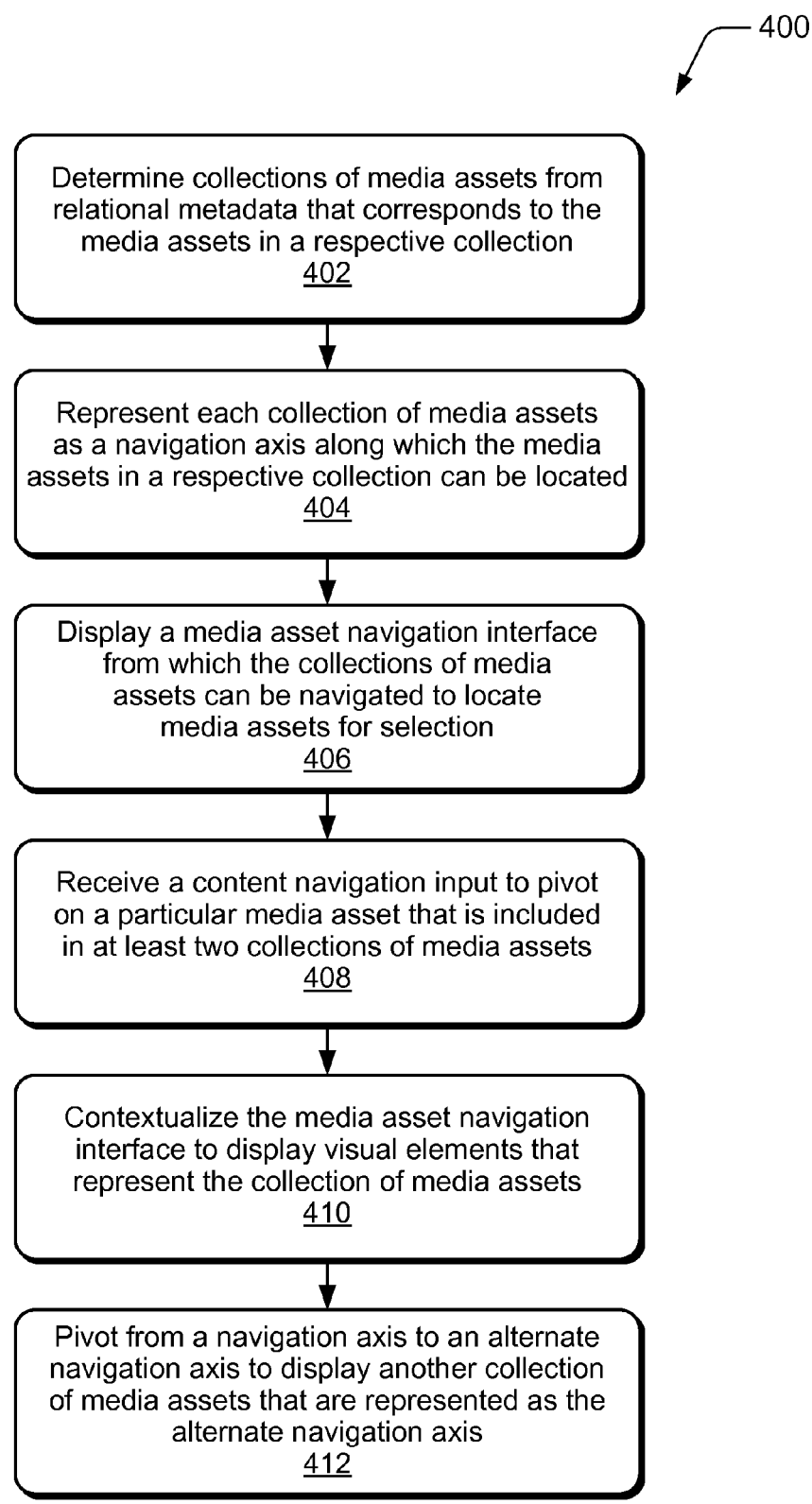
FIG. 4 illustrates example method(s) for media asset pivot navigation in accordance with one or more embodiments.

FIG. 4 illustrates example method(s) 400 for media asset pivot navigation. The order in which the method is described is not intended to be construed as a limitation, and any number of the described method blocks can be combined in any order to implement the method, or an alternate method.

At block 402, collections of media assets are determined from relational metadata that corresponds to the media assets in a respective collection. For example, the media asset navigation application 140 at device 108 and/or the media asset navigation service 142 at content distributor 102 (FIG. 1) determines the collections of media assets 144 based on the relational metadata 146 and/or any other relevant media asset associations. The media assets include live television programs, recorded videos, music files, photographs, and/or documents, and multiple ones of the media assets can be associated with more than one of the collections of media assets based on the relational metadata. The collections of media assets 144 include the global media assets 110 maintained at the content distributor 102 and the local media assets 114 maintained at the device 108, and the relational metadata 146 corresponds to both the global media assets and the local media assets.

At block 404, each collection of media assets is represented as a navigation axis along which the media assets in a respective collection can be located. For example, the media asset navigation axes 200 (FIG. 2) illustrates various collections of media assets that are each represented as a navigation axis along which the media assets in a respective collection can be located by pivot navigation. A user can navigate the relationships of the media assets in an abstract information space when searching for viewing choices, song selections, photo viewing, and the like.

At block 406, a media asset navigation interface is displayed from which the collections of media assets can be navigated to locate the media assets for selection. For example, the media asset navigation application 140 at device 108 initiates a display of the media asset navigation interface 302 (FIG. 3) from which the collections of media assets can be navigated to locate the media assets for selection. A collection of media assets are represented on the media asset navigation interface 302 by a non-textual visual element that indicates a relationship of the media assets in the collection. The media asset navigation interface 302 includes multiple collections of media assets, and the collections are each displayed for navigation along a respective navigation axis.

At block 408, a navigation input is received to pivot on a particular media asset that is included in at least two collections of media assets. For example, the media asset navigation application 140 at device 108 receives a navigation pivot input at a particular media asset 210 to pivot between a navigation axis 208 and an alternate navigation axis 214. The navigation input is received via any one of a two-input controller, a gaming system controller, a pointing device, a touch controller, or a gestural controller.

At block 410, the media asset navigation interface is contextualized to display one or more visual elements that represent the collection of media assets. For example, the media asset navigation application 140 contextualizes the visual elements 304 when displayed on media asset navigation interface 302 to represent the collections of media assets based on previous user inputs to interact with the media assets of the collections. In various examples, the image 310 of the movie poster is changed to a static image of a scene from the point in a movie where a viewer paused or stopped watching the movie. The photo 306 represents the last collection of photos viewed by the user, is displayed as the last photo selected for viewing, or is displayed as the next photo for viewing. Similarly, the image 308 of the music cover is displayed to represent the last music that a user selected for playback.

At block 412, the navigation axis is pivoted to an alternate navigation axis to initiate a display of an additional collection of media assets that are represented as the alternate navigation axis. For example, a user navigates from the current selection 204 (FIG. 2) to find movies (e.g., other media assets) in a collection of popular media assets 206 along a navigation axis 208. The user may navigate the popular movies and pivot on a media asset 210 that is also associated with a collection of media assets 212 that include a particular actor, and that is represented by the navigation axis 214.

Figure 5:
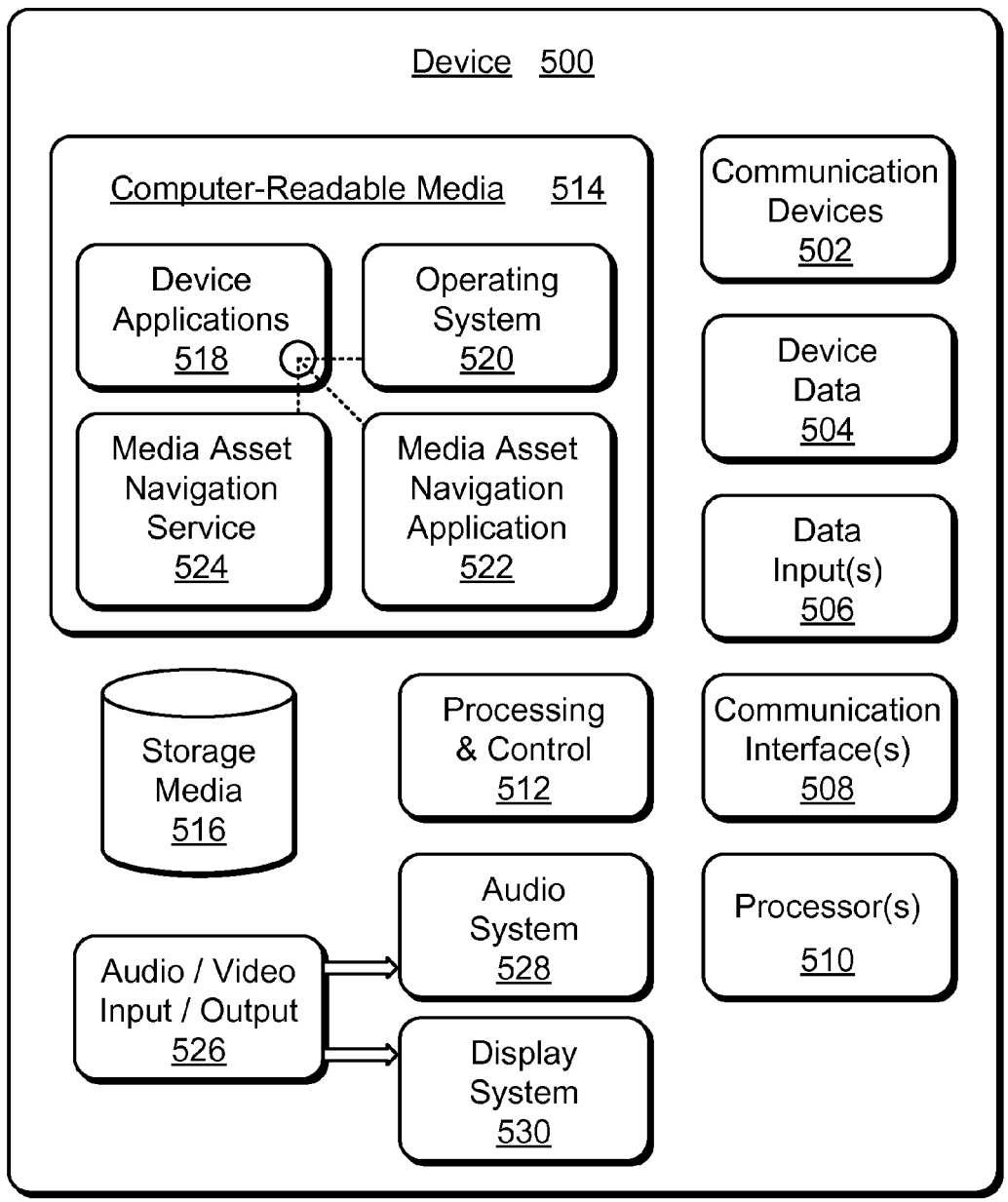
FIG. 5 illustrates various components of an example device that can implement embodiments of media asset pivot navigation.

FIG. 5 illustrates various components of an example device 500 that can be implemented as any type of client device and/or content distributor as described with reference to FIG. 1 to implement embodiments of media asset pivot navigation. In various embodiments, device 500 can be implemented as any one or combination of a wired and/or wireless device, as any form of television client device (e.g., television set-top box, digital video recorder (DVR), etc.), consumer device, computer device, portable computer device, media device, communication device, video processing and/or rendering device, appliance device, gaming device, electronic device, and/or as any other type of device. Device 500 may also be associated with a user (i.e., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include media assets and any type of audio, video, and/or image data. Device 500 includes one or more data inputs 506 via which any type of data, media content, and/or inputs can be received, such as user-selectable inputs, music, television media content, recorded video content, and any other type of audio, video, and/or image data received from a content or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of media asset pivot navigation. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of media asset pivot navigation, such as a media asset navigation application 522 (e.g., when device 500 is implemented as a client device) and/or a media asset navigation service 524 (e.g., when device 500 is implemented as a server device or content distributor). In this example, the device applications 518 are shown as software modules and/or computer applications. Alternatively or in addition, the media asset navigation application 522 and the media asset navigation service 524 can be implemented as hardware, software, firmware, or any combination thereof.

Device 500 can also include an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Although embodiments of media asset pivot navigation have been described in language specific to features and/or methods, it is to be understood that the subject of the appended claims is not necessarily limited to the specific features or methods described. Rather, the specific features and methods are disclosed as example implementations of media asset pivot navigation.

The invention claimed is:

1. A method implemented by a device that executes a media asset navigation application, the method comprising:

determining collections of media assets that are determined from relational metadata that corresponds to the media assets in a respective collection, each collection of media assets being represented as a navigation axis along which the media assets in a respective collection can be located, and multiple ones of the media assets being associated with one or more of the collections of media assets based on the relational metadata;

generating a media asset navigation interface for display from which the collections of media assets can be navigated to locate the media assets for selection, the media asset navigation interface including a display of a collection of media assets represented as a navigation axis;

receiving a navigation pivot input to pivot from the navigation axis to an alternate navigation axis to initiate a display of an additional collection of media assets that are represented as the alternate navigation axis; and receiving one or more media navigation inputs to navigate among the additional collection of media assets along the alternate navigation axis.

2. A method as recited in claim 1, further comprising pivoting on a particular media asset that is included in both the collection of media assets and the additional collection of media assets based on the relational metadata, and wherein the particular media asset is a pivot between the navigation axis and the alternate navigation axis.

3. A method as recited in claim 1, wherein the navigation pivot input is received via at least one of a two-input controller, a gaming system controller, a pointing device, a touch controller, or a gestural controller.

4. A method as recited in claim 1, wherein the media asset navigation interface includes multiple collections of the media assets, and wherein the collections are each displayed for navigation along a respective navigation axis.

5. A method as recited in claim 1, wherein the collections of media assets include global media assets maintained at a server device and local media assets maintained at the device, and wherein the relational metadata corresponds to both the global media assets and the local media assets.

6. A method as recited in claim 1, wherein the media assets include at least one of live television programs, recorded videos, music files, photographs, or documents.

7. A method as recited in claim 1, wherein the collection of media assets are represented on the media asset navigation interface by a non-textual visual element that indicates a relationship of the media assets in the collection.

8. A method as recited in claim 7, further comprising contextualizing the media asset navigation interface to display one or more visual elements that represent the collection of media assets based on previous user inputs to interact with one or more of the media assets of the collection.

9. A media asset navigation system, comprising:

a device that includes at least a memory and a processor to implement a media asset navigation application that is configured to:

determine collections of media assets that are determined from relational metadata that corresponds to the media assets in a respective collection, each collection of media assets being represented as a navigation axis along which the media assets in a respective collection can be located, and multiple ones of the media assets being associated with one or more of the collections of media assets based on the relational metadata;

generate a media asset navigation interface for display from which the collections of media assets can be navigated to locate the media assets for selection, the media asset navigation interface including a display of a collection of media assets represented as a navigation axis;

receive a navigation pivot input that initiates a navigation pivot from the navigation axis to an alternate navigation axis to initiate a display of an additional collection of media assets that are represented as the alternate navigation axis; and receive a media navigation input to navigate among the additional collection of media assets along the alternate navigation axis.

10. A media asset navigation system as recited in claim 9, wherein the media asset navigation application is further configured to receive the navigation pivot input to initiate the navigation pivot on a particular media asset that is included in both the collection of media assets and the additional collection of media assets based on the relational metadata, and wherein the particular media asset is a pivot between the navigation axis and the alternate navigation axis.

11. A media asset navigation system as recited in claim 10, wherein the media asset navigation application is further configured to receive the navigation pivot input via at least one of a two-input controller, a gaming system controller, a pointing device, a touch controller, or a gestural controller.

12. A media asset navigation system as recited in claim 9, wherein the media asset navigation interface includes multiple collections of the media assets, and wherein the collections are each displayed for navigation along a respective navigation axis.

13. A media asset navigation system as recited in claim 9, wherein the media asset navigation application is further configured to determine the collections of media assets from global media assets maintained at a server device and local media assets maintained at the device, and wherein the relational metadata corresponds to both the global media assets and the local media assets.

14. A media asset navigation system as recited in claim 13, wherein the media assets include at least one of live television programs, recorded videos, music files, photographs, or documents.

15. A media asset navigation system as recited in claim 9, wherein the collection of media assets are represented on the media asset navigation interface by a non-textual visual element that indicates a relationship of the media assets in the collection.

16. A media asset navigation system as recited in claim 9, wherein the media asset navigation application is further configured to contextualize the media asset navigation interface to display one or more visual elements that represent the collection of media assets based on previous user inputs to interact with one or more of the media assets of the collection.

17. Computer-readable media having stored thereon computer-executable instructions that, when executed by a client device that includes at least a processor, initiate the client device to:

determine collections of media assets that are determined from relational metadata that corresponds to the media assets in a respective collection, each collection of media assets being represented as a navigation axis along which the media assets in a respective collection can be located;

generate a media asset navigation interface to display the collections of media assets;

receive a navigation pivot input that initiates a navigation pivot from a navigation axis that represents a collection of media assets to an alternate navigation axis to initiate a display of an additional collection of media assets that are represented as the alternate navigation axis; and receive a media navigation input to navigate among the additional collection of media assets along the alternate navigation axis.

18. Computer-readable media as recited in claim 17, wherein the computer-executable instructions, when executed, further initiate the client device to receive the navigation pivot input to initiate the navigation pivot on a particular media asset that is included in both the collection of media assets and the additional collection of media assets based on the relational metadata, and wherein the particular media asset is a pivot between the navigation axis and the alternate navigation axis.

19. Computer-readable media as recited in claim 18, wherein the computer-executable instructions, when executed, further initiate the client device to receive the navigation pivot input via at least one of a two-input controller, a gaming system controller, a pointing device, a touch controller, or a gestural controller.

20. Computer-readable media as recited in claim 17, wherein the computer-executable instructions, when executed, further initiate the client device to determine the collections of media assets from global media assets maintained at a server device and local media assets maintained at the client device, and wherein the relational metadata corresponds to both the global media assets and the local media assets.

* * * * *